July 27, 1926.
C. D. REYNOLDS
GLARELESS HEADLIGHT
Filed Feb. 19, 1925
1,593,848
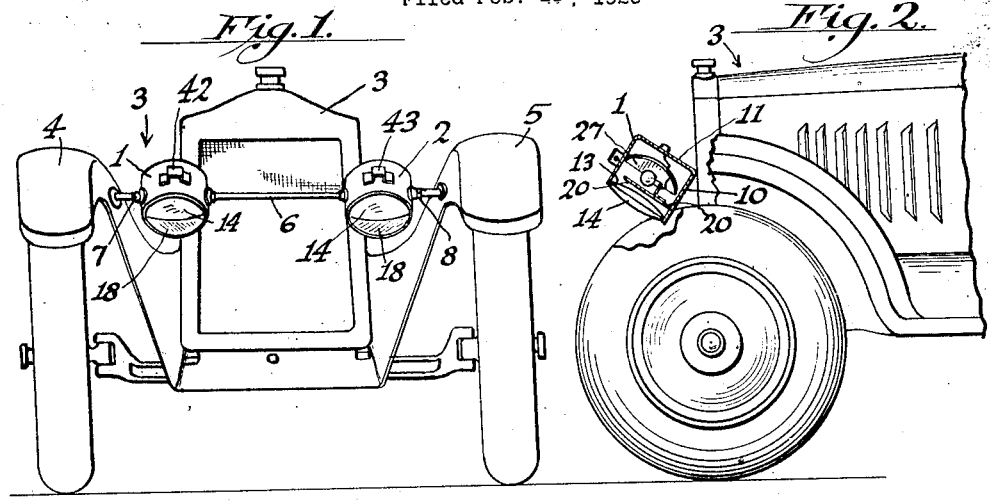
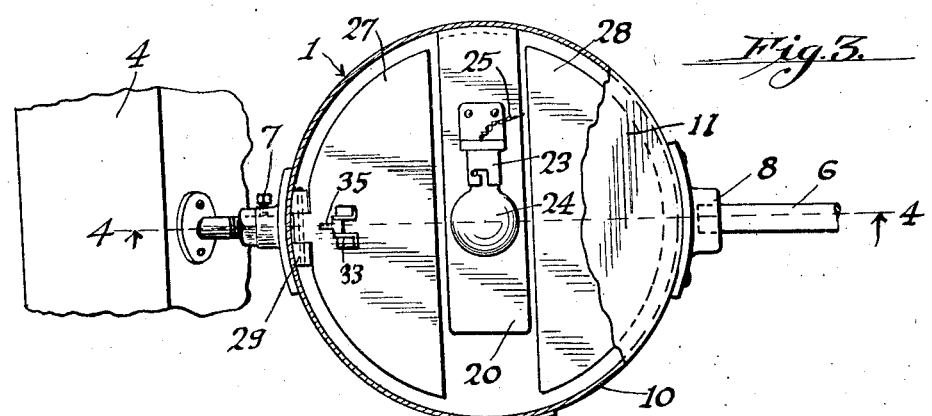
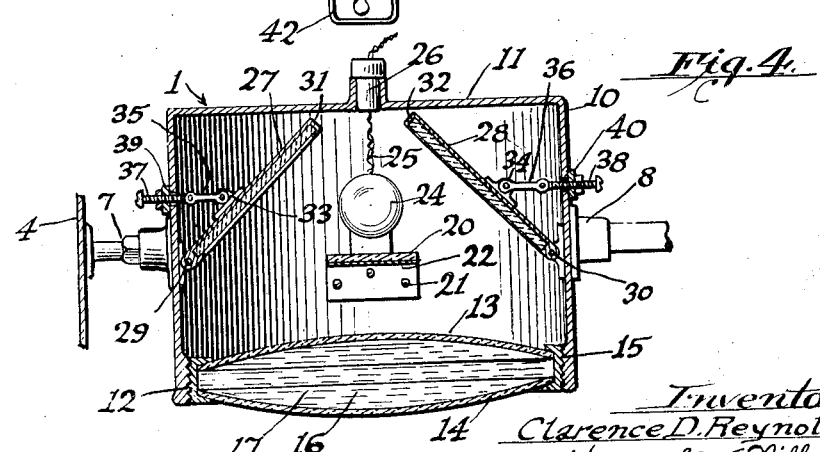
Inventor:
Clarence D. Reynolds Patented July 27, 1926.

1,593,848

UNITED STATES PATENT OFFICE.

CLARENCE D. REYNOLDS, OF WHITTIER, CALIFORNIA.

GLARELESS HEADLIGHT.

Application filed February 19, 1925. Serial No. 10,304.

This invention relates to headlights and particularly to headlights for automobiles.

It is the object of the invention to provide a glareless headlight wherein the source of light is hidden from the front and is concentrated to produce a substantially horizontal flood of light which will not glare into the faces of oncoming motorists.

The invention is a departure from the conventional type of headlight having a parabolic reflector and the glareless headlights are adapted to be normally disposed at an angle relative to the surface of the ground.

Other objects and advantages will be made manifest in the following specification of an embodiment of the invention illustrated in the accompanying drawings, in which:

Figure 1 is a front view of an automobile provided with glareless headlights 1 and 2.

Figure 2 is a side view of the automobile equipped with the glareless headlights, one of which has parts broken away to illustrate the construction.

Figure 3 is a horizontal view of headlight 1 looking in the direction of the arrow 3 of Figure 1.

Figure 4 is a sectional view taken on the line 4—4 of Figure 3.

The automobile 3 is equipped with glareless headlights 1 and 2 which are mounted between fenders 4 and 5 upon a supporting rod 6, by means of any suitable type of bracket or clamping arrangements 7 and 8. The body of the headlight illustrated herein is formed of a drum 10 substantially cylindrical in shape, having a back 11 and threads 12 interiorly of the forward end of the drum. The supporting clamps 7 and 8 may be riveted upon opposite sides of the drum.

A pair of concavo-convex lenses 13 and 14 are sealed in a rim 15 having external threads adapted to screw into the forward end of the drum 10. The lenses are disposed with their concave faces contiguous but separated a slight distance, forming a space indicated at 16. This space is filled with water 17. The lower half of the inner lens 13 may properly be silvered upon its concave face to form a mirror 18 reflecting inwardly of the headlight. The silvered surface in the water chamber may be covered with a water-proofing composition.

Within the drum 10 a flat surfaced mirror 20, shown formed of glass, is riveted at one end 21 to the circular wall of the drum. The mirror 20 is given a dull finish on the forward side 22 and is adapted to reflect inwardly toward the back 11 of the headlight. Mounted upon the mirror 20 is an electric light socket 23 disposed in such position that an electric light 24 will be maintained in substantially the center of the drum 10. An electric cord 25 extends from the socket 23 to a plug 26 mounted upon the back of the drum and from thence to a suitable source of electric power such as the storage battery of the automobile.

A pair of oppositely disposed semi-circular flat surfaced reflectors 27 and 28 are pivoted at 29 and 30 to the inner wall of the drum 10. These reflectors are normally disposed diagonally with reference to the back of the drum and converge as they approach the said back, so that their inner ends 31 and 32 are separated slightly less than the width of the mirror 20. Brackets 33 and 34 mounted upon the rear faces of the reflectors 27 and 28 provide pivots for the links 35 and 36 which are secured to adjusting screws 37 and 38 threaded through lugs 39 and 40 mounted upon the exterior of the drum 10. The object of the adjusting screws is to permit of adjustment of the angle at which the reflectors 27 and 28 are disposed.

Small signal lights 42 and 43 are mounted upon the exterior of the drum 10. In the operation of the glareless head light when the electric light 24 is caused to burn, the mirror 20 will prevent direct rays of the light from being seen from the front and will tend to direct the light rearwardly and diagonally toward the reflectors 27 and 28. The rays of light striking the reflectors 27 and 28 will be reflected forwardly through the lenses 13 and 14, the silvered lower half of the lens 13 preventing shafts of light from passing therethrough and the forwardly tilted angle at which the headlights are normally positioned will cause the light issuing to be diffused on a substantially horizontal plane. On account of the lower part of the lens 13 being silvered on its concave side the light cannot pass through this part but is reflected back into the drum. These rays will probably be reflected backwards and forwards some of which will be finally reflected through the upper clear portion of the lens. The light passing through the upper portion of the lens on account of the two concavo-convex lenses and the water therebetween, will be refracted downwardly and towards the axial center line of the lens.

Various changes may be made without departing from the spirit of the invention as claimed.

What is claimed is:

1. A headlight comprising in combination a body in the form of a drum having a pair of concavo-convex lenses in the front opening, said lenses being spaced apart with the concaved sides towards each other and with a filling of liquid therebetween, a flat cross inwardly reflecting mirror secured to the wall of the drum and extending part way across the lens, an electric lamp mounted behind said cross mirror, a pair of side mirrors positioned substantially behind the cross reflecting mirror, and means to adjust said side mirrors at different angles.

2. A headlight comprising in combination a body in the form of a drum having a pair of concavo-convex lenses at the front opening, said lenses being sealed into a rim and spaced apart with the concaved faces towards each other, a liquid filling being contained between the lenses and the rim, the inside lens having its lower half silvered on its concaved face, forming a reflector inward, a flat cross inwardly reflecting mirror secured to the wall of the drum and extending part way across the lenses, an electric lamp mounted behind said cross mirror, a pair of side mirrors positioned substantially behind the cross mirror and hinged to opposite sides of the said drum, and a screw threaded means attached to the side mirrors and extending through the sides of the drum, to adjust the side mirrors at different angles.

In testimony whereof I have signed my name to this specification.

CLARENCE D. REYNOLDS.